United States Patent [19]
Crosley et al.
[11] Patent Number: 4,837,822
[45] Date of Patent: Jun. 6, 1989

[54] CRYPTOGRAPHIC BASED ELECTRONIC LOCK SYSTEM AND METHOD OF OPERATION

[75] Inventors: Thomas W. Crosley, Saratoga, Calif.; Wayne Davison, Portland, Oreg.; James R. Goldberg, Novato, Calif.; Leonard L. Hofheins, Concord, Calif.; Ronald D. Lichty, San Francisco, Calif.; Charles A. Vollum; Stephen H. Vollum, both of Sherwood, Oreg.; Victor H. Yee, Oakland, Calif.

[73] Assignee: Schlage Lock Company, San Francisco, Calif.

[21] Appl. No.: 849,472

[22] Filed: Apr. 8, 1986

[51] Int. Cl.[4] .......... H04L 9/04

[52] U.S. Cl. .......... 380/23; 380/30; 380/52

[58] Field of Search .......... 380/23, 30, 52, 59; 235/382, 382.5; 340/825.31

[56] References Cited

U.S. PATENT DOCUMENTS

| | | | |
|---|---|---|---|
| Re. 29,259 | 6/1977 | Sabsay | 380/23 |
| 3,800,284 | 3/1974 | Zucker et al. | 340/825.31 |
| 3,821,704 | 6/1974 | Sabsay | 380/23 |
| 3,860,911 | 1/1975 | Hinman et al. | 340/825.31 |
| 3,906,447 | 9/1975 | Crafton . | |
| 4,177,657 | 12/1979 | Aydin . | |
| 4,207,555 | 6/1980 | Trombly . | |
| 4,213,118 | 6/1980 | Genest et al. | 380/23 |
| 4,385,231 | 5/1983 | Mizutani et al. | 235/382 |
| 4,405,829 | 9/1983 | Rivest et al. | 380/30 |
| 4,411,144 | 10/1983 | Aydin . | |
| 4,424,414 | 1/1984 | Hellman et al. | 380/30 |
| 4,453,074 | 6/1984 | Weinstein | 235/382 |
| 4,511,946 | 4/1985 | McGahan . | |
| 4,519,228 | 5/1985 | Sornes | 235/382.5 |
| 4,558,175 | 12/1985 | Genest et al. | 235/382 |
| 4,562,343 | 12/1985 | Wiik et al. | 235/382.5 |
| 4,602,150 | 7/1986 | Nishikawa et al. | 235/382 |
| 4,625,076 | 11/1986 | Okamoto et al. | 380/30 |
| 4,633,036 | 12/1986 | Hellman et al. | 380/30 |

OTHER PUBLICATIONS

Meyer and Matyas, *Cryptography*, John Wiley and Sons, 1982, preface and pp. 13-53.

*Primary Examiner*—Salvatore Cangialosi
*Attorney, Agent, or Firm*—Flehr, Hohbach, Test, Albritton & Herbert

[57] ABSTRACT

The present invention relates to electronic locks and electronic locking systems, to electronic locking systems which use remotely encoded keycards and, in particular, to an electronic locking system which utilizes public key cryptography.

10 Claims, 8 Drawing Sheets

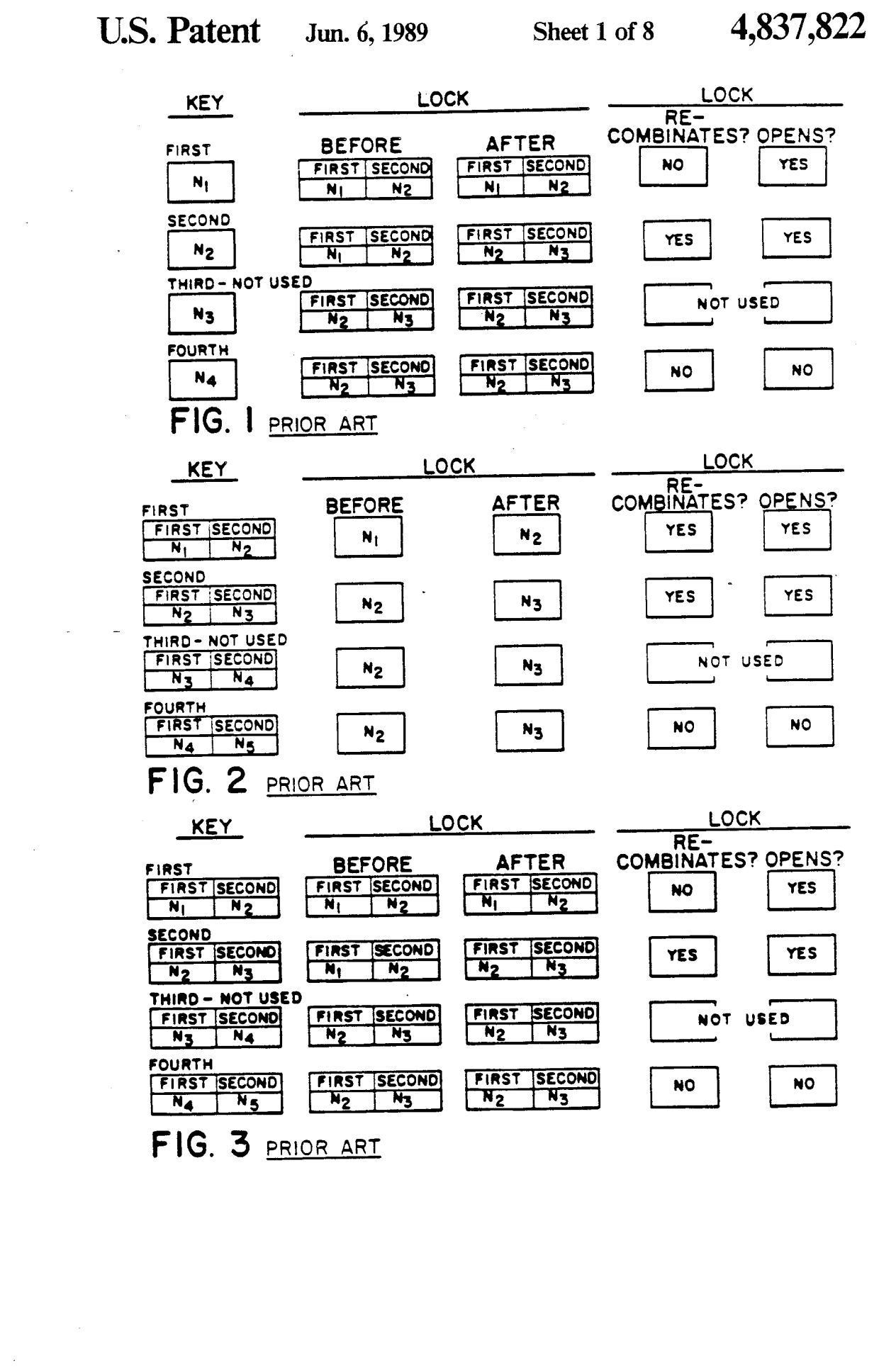

| KEY | LOCK BEFORE (FIRST / SECOND) | LOCK AFTER (FIRST / SECOND) | LOCK RE-COMBINATES? | LOCK OPENS? |
|---|---|---|---|---|
| FIRST: $N_1$ | $N_1$ / $N_2$ | $N_1$ / $N_2$ | NO | YES |
| SECOND: $N_2$ | $N_1$ / $N_2$ | $N_2$ / $N_3$ | YES | YES |
| THIRD - NOT USED: $N_3$ | $N_2$ / $N_3$ | $N_2$ / $N_3$ | NOT USED | NOT USED |
| FOURTH: $N_4$ | $N_2$ / $N_3$ | $N_2$ / $N_3$ | NO | NO |

FIG. 1 PRIOR ART

| KEY (FIRST / SECOND) | LOCK BEFORE | LOCK AFTER | LOCK RE-COMBINATES? | LOCK OPENS? |
|---|---|---|---|---|
| FIRST: $N_1$ / $N_2$ | $N_1$ | $N_2$ | YES | YES |
| SECOND: $N_2$ / $N_3$ | $N_2$ | $N_3$ | YES | YES |
| THIRD - NOT USED: $N_3$ / $N_4$ | $N_2$ | $N_3$ | NOT USED | NOT USED |
| FOURTH: $N_4$ / $N_5$ | $N_2$ | $N_3$ | NO | NO |

FIG. 2 PRIOR ART

| KEY (FIRST / SECOND) | LOCK BEFORE (FIRST / SECOND) | LOCK AFTER (FIRST / SECOND) | LOCK RE-COMBINATES? | LOCK OPENS? |
|---|---|---|---|---|
| FIRST: $N_1$ / $N_2$ | $N_1$ / $N_2$ | $N_1$ / $N_2$ | NO | YES |
| SECOND: $N_2$ / $N_3$ | $N_1$ / $N_2$ | $N_2$ / $N_3$ | YES | YES |
| THIRD - NOT USED: $N_3$ / $N_4$ | $N_2$ / $N_3$ | $N_2$ / $N_3$ | NOT USED | NOT USED |
| FOURTH: $N_4$ / $N_5$ | $N_2$ / $N_3$ | $N_2$ / $N_3$ | NO | NO |

FIG. 3 PRIOR ART

CRYPTOGRAPHIC BASED ELECTRONIC LOCK SYSTEM AND METHOD OF OPERATION

BACKGROUND OF THE INVENTION

The present invention relates to electronic locks and electronic locking systems, to electronic locking systems which use remotely encoded keycards and, in particular, to an electronic locking system which utilizes public key cryptography.

The process of operating an electronic lock and updating the program information in that lock based upon the coded information in a keycard (or key), that to encode the keycard, is constrained by several factors. These include, the relatively very small data storage which is available on the keycard and in the electronic lock itself, and the limited speed and computational abilities of the microprocessors which are used in such locks. These space and computational limitations are very important when one considers that the keycard must include some sort of secret identifying code or combination, as well as instructions for operating (or preventing operation) of a selected lock or locks, and that the lock must both validate the card and implement the instructions.

To date, there are available only a few possibly viable systems which use a remotely programmed keycard to control the mechanical operation and programming of an electronic lock. These approaches are believed to be best exemplified by Zucker U.S. Pat. No. 3,800,284; Hinman U.S. Pat. No. 3,860,911; Sabsay U.S. Pat. No. 3,821,704 and its reissue Re. 29,259; and commonly assigned McGahan U.S. Pat. No. 4,511,946.

In the system disclosed in the Zucker patent, at any given time prior to reprogramming by a new lock, the lock will contain two types of code information: first, the previous code number and, second, the next sequential code number. The key is encoded with a single combination. This system is designed so that, presumably, when a valid, properly sequenced new key is issued, the key combination will match the next sequential combination in the lock and cause the lock both to open and to reprogram itself. During reprogramming, a function generator in the lock uses the combination previously stored in the lock to generate a current combination and the next sequential combination. Upon subsequent use of this same key, the lock will open because the first lock code equals the current key code. However, the lock is not recombinated or reprogrammed at this time because the next sequential combination has already been resequenced and no longer equals the key code. After recombination by the next key, the current lock code is no longer equal to the code of the next previous key and, as a consequence, that key will no longer open the lock.

The Hinman system uses two combinations in both the lock and the key, but operates in a manner similar to that employed by Zucker.

The electronic lock disclosed in the Sabsay patent is the converse of that used in Zucker in that the lock is assigned one combination while the key is assigned two fields or combinations. The key fields are: a first field or authorization number which is the previously authorized code, and a second field or key number which contains the current authorized code. When a key is presented to the lock, if the "current" or second field equals the single lock number, the lock is opened. If the "previous" code in the first, authorization field equals the lock number, the lock both recombinates and then opens. When a new key is presented to the lock, the previous code in the key's first field should equal the current lock number so the lock will recombinate and then open. Thereafter each time this key is used (prior to recombination by the next key), the updated lock number will equal the current code in the key's second field and the lock will open but not recombinate.

The commonly assigned McGahan patent uses first and second combinations in the lock as well as in the key. Both the lock and key combinations are sequential in that the second combination is the next sequential number above the first combination. During use, if the first key combination equals the first lock combination and the second key combination equals the second lock combination, the lock opens. If this equality does not exist but the first key combination equals the second lock combination, the lock both opens and recombinates. Thus, when the properly sequenced next key is presented to the lock, the first key combination will equal the second lock combination and the lock will open and recombinate. Thereafter, until a new key recombinate the lock, the first and second lock and key combinations are equal and the present key will open the lock but will not cause it to recombinate. Prior keys will not be able to open or recombinate the lock because neither of the two required equalities exists between the lock and key codes.

However, to our knowledge none of the presently available electronic lock systems, including McGahan, eliminates the sequencing problem which occurs when the key sequence and the lock sequence get out of step, for example, because a duly issued and sequenced card is not used. This situation is illustrated in FIGS. 1 through 3 for Zucker, Sabsay and McGahan, respectively. In each case, first and second validly issued and sequenced keys are used as anticipated and recombinate the lock as planned. However, the third key, which is also validly issued and sequenced, is not used. This can occur simply because a guest does not enter his or her room or does not use a particular door in a suite of rooms. Whatever the reason, following the failure to use the third duly issued card, the fourth and subsequent cards will not operate the lock.

Additionally, in the existing electronic lock systems, the security function and operating functions compete for the limited space available in the keycard and lock, with the result that either or both functions may be limited to an undesirable or unacceptable degree. For example, it is desirable to have a large selection of possible lock uses such as guest levels, suite levels, common areas, etc., and to be able to provide access to different combinations of locks or lock levels via a single keycard. To date, the inherent physical limitations of the keycards and electronic locks have constrained even the most versatile of electronic locking systems to a single choice, at any lock, from among eight or nine possible master levels, and control, by any individual keycard, of only a single master level or lock.

SUMMARY OF THE INVENTION

In view of the above discussions, it is one object of the present invention to provide an electronic locking system and a method of operating the system in which security is provided by public key cryptography.

It is a related object to provide such an electronic locking system and method of operation in which the security function is separated from messages carried on the keycard encoding the message field using digital signature-type cryptography.

It is still another related object of the present invention to provide an electronic locking system and method of operation in which a keycard communicates with the electronic lock by way of a flexible protocol thereby increasing the number of operations which can be performed at individual locks and controlled or effected by individual keys.

In one embodiment, the present invention involves the process of enciphering the message field of a keycard using public key cryptography, then deciphering the encoded card message at the lock to validate the message prior to implementation thereof.

In a presently preferred embodiment, our present electronic lock system and method use a number x and a modulo function $x^2 \bmod n = m$, where n is the public key and m is the message. The encoded or signed message x is transmitted via the keycard to the lock, which deciphers or unsigns the underlying card message m from the enciphered message x by calculating $x^2 \bmod n$.

In a specific embodiment designed to facilitate the computation of x, a private key is used comprising a pair of prime numbers p and q which are determined such that m=pq. The public key n is determined such that it has only two factors: the private keys p and q. The enciphered message x is computed from the message m by calculating x mod n. This calculation can only be computed in a reasonable amount of time by using the private keys p and q.

The above use of public key cryptography permits the use of a flexible communications protocol, which itself provides a number of advantages described below.

In addition, the invention includes various unique electronic circuit and mechanical lock functions described below.

BRIEF DESCRIPTION OF THE DRAWINGS

The above and other features of the present invention are described with respect to the drawings in which:

FIGS. 1 through 3 depict three prior art approaches for validating keys and responsively recombinating and opening locks, and disclose the sequencing problem which commonly results when a valid key is not used;

DETAILED DESCRIPTION OF THE INVENTION

A. Overall System

Figure 4:
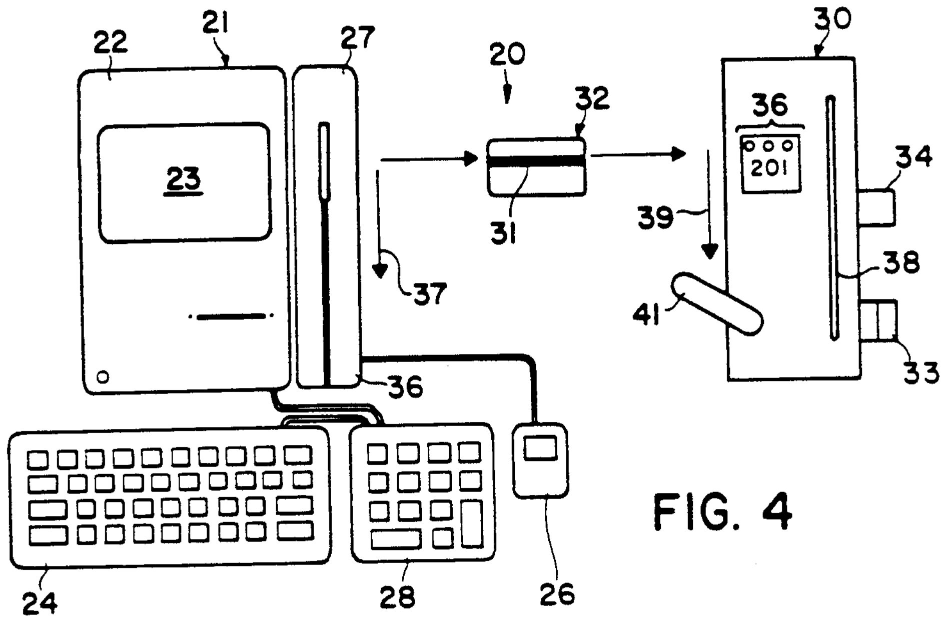
FIG. 4 is a schematic representation of the overall electronic locking system of the present invention.

A presently preferred embodiment 20 of an electronic lock system incorporating our invention is depicted in FIG. 4. The electronic lock system includes an encoder console 21, which includes a computer 22 and monitor 23, keyboard 24, a so-called Mouse control unit 26 or Trac ball, and card reader/writer unit 27. The console may include a keypad 28 for facilitating the entry of numeric data into the computer memory.

The electronic lock system 20 also includes a standalone electronic lock 30 containing a microprocessor which is programmed by information encoded on magnetic stripe 31 of cards 32 for selectively effecting locking and unlocking operation of latch 33 and deadbolt 34. Green, yellow and red lights, typically LED's, indicated collectively at 36, indicate the status of the lock 30. Also, an audible buzzer 40 (FIG. 10) is incorporated into the lock. It should be understood that the card (or other media), the reader and the writer units can be of any known form such as magnetic, optical or infrared. Regarding our lock system in general, those of skill in the art will readily implement the lock system using other components, based upon the description provided here.

In the presently preferred embodiment, the console utilizes an Apple® MacIntosh™ computer system and a commercially available card reader/writer unit. Similarly, the electronic lock utilizes a 6805 microprocessor and a conventional card reader unit. In addition, computer disc storage typically will be provided for the console unit. In large volume operations, it may be desirable to connect a number of consoles and associated hard disc storage using a local area network.

In operation, the data for the keycard 32 is entered into the console 21 using the keyboard 24, Mouse™ unit 26 and/or keypad 28 and the data is enciphered by the computer 21. The card 32 is then passed along slot 36 in the card reader/writer unit 27, as indicated by arrow 37, to record the enciphered data on the card. At the lock 30, the magnetic keycard 32 is passed along slot 38, as indicated by arrow 39, to close wake-up switch 71 (FIG. 10) and thus activate the microprocessor 51, and also to enable the lock card reader unit to retrieve the encoded data. The lock microprocessor then deciphers or de-signs the data and determines if the encoded message x is a valid message m. If the data message is valid, it is used to program the lock and/or to operate the lock. For example, and as discussed more fully below, data transmitted by a valid, properly sequenced keycard 32 determines the degree of security provided by the latch 33 and the deadbolt 34, and when and whether the handle 41 will be capable of unlocking the lock. In addition, the information communicated by the keycard 32 to the lock 30 includes various forms of instruction to the lock, such as instructions for it to open when handle 41 is turned; to open only if the deadbolt 34 is not set; to lock out a maid; etc.

The system 20 provides system security by encoding the keycard message using a unique digital signature enciphering and deciphering methodology which is quickly executed at the console and lock. The incorporation of a flexible protocol provides greater flexibility in operation than is available in previous electronic locking systems. In addition, a sequencing routine is used which is not subject to the out-of-step problem discussed above. These and other features are discussed below.

B. Digital Signature

Figure 5:
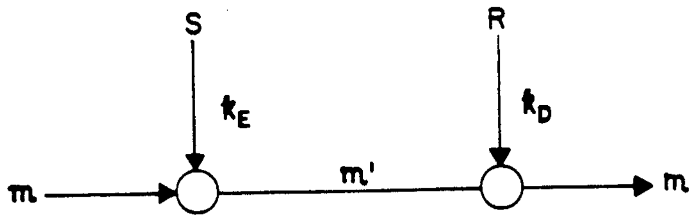
FIG. 5 schematically represents the public key cryptographic approach which is incorporated in the present electronic locking system and used in its operation.

As mentioned, our electronic lock system is adapted to use a modified form of digital signature public key cryptography, despite the data storage and computational limitations which are inherent to such a system. As shown in FIG. 5, in general, using public key cryptography, a sender, S, enciphers a message, m, using an enciphering key $k_E$ and transmits or transfers the encoded ciphertext message, m', to the receiver, R. The receiver uses deciphering key $k_D$ to transform the encoded message back to the original plaintext message, m.

The above generic cryptographic approach can be implemented in two different species approaches: conventional cryptography and public cryptography. In conventional cryptography, the enciphering and deciphering keys are the same, $k_E=k_D=k$. This approach includes the well-known conventional digital encryption standard, DES. One crucial problem with conventional cryptographic systems if such were applied to electronic locking systems is that it would be necessary to communicate the common key k to both the sender and the receiver. The security of this key would then become crucial to the security of the system itself. For example, the security of the key might be breached by reverse engineering or inspection of the lock, or by a breach of confidentiality on the part of any of a number of people who may necessarily have access to the key.

In public cryptography, $k_D=k_E$. The species public cryptography encompasses two subspecies or options. First, the enciphering key $k_E$ can be public and the deciphering key $k_D$ secret, in which case anyone can send a message but only the receiver, R, can decode it. This approach is exemplified by electronic mail systems.

The second public key cryptographic approach is the converse of the first. That is, the enciphering key, $k_E$, is kept secret and the deciphering key, $k_D$, is public. As a result, only the sender, S, who has the secret key, $k_D$, can transmit a valid encoded message, but anyone can decipher the encoded message to verify that the encoded message is valid. This is the so-called digital signature approach and is preferred for its potential security. One exemplary application of the system is described in Meyer and Matyas, *Cryptography*, John Wiley and Sons, 1982, especially the section of Chapter 2, Block Cyphers, concerning RSA Algorithms, pp 33-48. *Cryptography* is incorporated herein by reference.

The RSA algorithm (named for its inventors) basically involves evaluating a modulo function of the type $x^k \bmod n=m$, where x is a message which when raised to the power of the key k and divided by a composite number n provides a remainder, m.

The present electronic locking key digital signature is a modified version of the RSA type of algorithm, of the form $x^2 \bmod n=m$. Use of this modulo function to transmit encoded messages involves calculating at the console a square root x such that $x^2 \bmod n=m$, i.e., such that $x^2$ divided by n provides the remainder, m. The quotient is not used. Here, m is the message to be transmitted, n is the public key and x is the encoded message, m', FIG. 5.

At the lock, the function $x^2 \bmod n$ is calculated in order to retrieve or unsign the encoded message, m.

The security provided by our application of public key cryptography to locking systems is directly proportional to the size of the public key number. Thus, providing security which, as a practical matter, cannot be breached involves the use of a very large public key. The present version of the electronic locking system 20 uses a public key, n, of about 111 digits. From the number theory problem of quadratic residuosity, it can be proven that finding square roots modulo a composite number is as difficult as factoring that number. Thus, by choosing the 111 digit public key (n) to be the product of two large primes, this factoring problem can be made very difficult. Factoring a large number can require months or even years for even the fastest most sophisticated computer, such as Cray 2 supercomputer, let alone the capable but slower and less sophisticated console computer, and the much slower, small capacity computer system used in the lock 30. Furthermore, to our knowledge, the conflicting requirements presented by the large numbers which are required for security and the very fast operation ($\leqq 0.5$ seconds) which is required for convenient lock operation, can only be accomplished by using the following encoding/decoding sequences which we have devised.

The encoding/decoding algorithm encompasses three basic groups of steps: a precomputation of various values which are independent of the message value; encoding and signing the keycard message at the console; and verifying and recovering the keycard message at the lock (or console). All three of these algorithms share a set of common global variables:

1. p,q: a pair of primes known only to the console which are the secret key;
2. n: the public key, the product of p and q, its only factors;
3. p14,q14: the exponents used to find partial roots;
4. p2,q2: the partial roots of 2; and
5. kp,kq: the coefficients of combination—these are used to combine two partial roots.

The three steps are described below.

1. Precompute

This algorithm computes the values needed in the signing process. It is executed once each time the console is initialized. Its purpose is to reduce the time to sign a message by precomputing those values that are independent of the message value.

Using the chosen primes, p and q, this algorithm computes the public key (n), the exponents (p14 and q14), the partial roots of 2 (p2 and q2), and the coefficients of combination (kp and kq). These values are stored in the global variables shown above.

The algorithm for precomputing n,p14,ql4,p2,q2,kp,kq using p and q involves the following steps:

| Step | | Explanation |
|---|---|---|
| 1a. | p = the P | Save the secret key |
| 1b. | q = the Q | primes p and q. |
| 2. | n = p*q | Compute the public key value n by multiplying p and q. |
| 3. | p14 = (p+1) div 4 | Compute p's partial root exponent by adding 1 and dividing by four. |
| 4. | q14 = (q+1) div 4 | Compute q's partial root exponent in the same way. |
| 5. | p2 = power (2,p14,p) | Find p2 such that p2*p2 mod p = ±2. |

-continued

| Step | | Explanation |
|---|---|---|
| 6. | q2 = power (2,q14,q) | Find q2 such that q2*q2 mod q = ±2. |
| 7. | kp = q*power (q,p-2,p) | Find kp such that kp mod q = 0, and kp mod p = 1. |
| 8. | kq = p*power (p,q-2,q) | Find kq such that kq mod q = 1, and kq mod p = 0. |

2. Sign Message

As mentioned, signing a message m consists of finding a value x such that $x^2$ mod n=m. Only 25 percent of the possible values of m have such roots By requiring m mod 4=2, adjustments can be made during the signature and verification process to allow the signing of any legal message value.

The signature algorithm first computes partial roots of m with respect to p and q, then synchronizes the partial roots by doubling m, if necessary. Finally, the two partial roots are combined to form the root with respect to n.

The signature algorithm steps are:

| Steps | Explanation |
|---|---|
| 1. mp = m mod p | mp is the residue of m mod p. |
| 2. mq = m mod q | mq is the residue of m mod q. |
| 3. xp = power (mp,p14,p) | Find xp such that xp*xp mod p = ±mp. |
| 4. xq = power (mq,q14,q) | Find xq such that xq*xq mod q = ±mq. |
| 5. tp = xp*xp mod p | Compute xp*xp mod p. |
| 6. tq = xq*xq mod q | Compute xq*xq mod q. |
| 7. IF (mp = tp) ≠ (mq tq) THEN BEGIN xp: = xp*p2 mod p xq: = xq*q2 mod q END. | If relative signs differ, should be signing 2m so find xp such that xp*xp mod p = ±2*m mod p and xq such that xq*xq mod q = ±2*m mod q. |
| 8. Sign Msg: = (xp*kp + xq*kq) mod n | Combine partial roots and return. |

3. Verify Signature and Recover Message

This algorithm computes $x^2$ mod n, and compensates for any adjustments made during the signature process, thus recovering the original message value, m, at the lock 30. The same basic algorithm is used in both the lock firmware and the console for verifying signed data.

This algorithm for recovering the original message from the signed message x and the public key n involves the steps of:

| Step | | Explanation |
|---|---|---|
| 1. | m: = x*x mod n | Square signed message, take remainder m after division by n. |
| 2a. | IF odd (m) then m: = n-m | If result is odd, m is "negative", so subtract it form n. |
| 2b. | t: = m div 2 | Halve the result and save in t. |
| 2c. | IF even t, then m: = t | If t is even, then m was doubled, and t is the correct value. |
| 3. | Verify Msg: = m | Return the original message value. |

The above Digital Signature algorithm solves one critical problem in that it chooses a public key, n, which has as its factors only the two large primes p and q and, in finding square roots modulo the composite number, $x^2$ mod n=m, provides a process for determining the message by use of the secret key, p,q, which is readily implemented by the console computer, yet is extremely difficult to crack.

There is a second critical problem involving the implementation of the digital signature cryptography to electronic lock technology, one that involves the lock computer. While the 6805 microcomputer currently used in the lock 30 is relatively fast and provides a relatively large amount of both random access memory (192 bytes) and read-only memory (4096 bytes), such a state-of-the-art computer microprocessor still provides a very small memory and computational capacity in comparison to the requirements for computing a very large number such as $x^2$ mod n. In addition, the available RAM scratch memory is further reduced to about 100 bytes, since about 50 bytes are required for other electronic lock functions. Simply put, there is not enough RAM scratch memory to preserve an encoded number x of about 46 bytes and at the same time develop its double length binary product $x^2$ as would normally be done.

These limitations become of even greater significance when considered in light of the previously mentioned conflicting needs to maximize the size of the computed number x in order to maximize security and at the same time to satisfy the requirement that the computations be done within ≦0.5 seconds to prevent unacceptable delay after the card is passed through the lock reading slot 38. In short and in addition to the computational efficiency which is required at the console and is provided by the p,q factoring algorithm described above, great computational efficiency is also required in order to compute $x^2$ mod n very quickly at the lock with the severely limited RAM scratch memory.

The present invention includes a computational approach which provides the desired efficiency. This algorithm allows the calculation of $x^2$ in the same RAM scratch storage required to store x. The algorithm is described below with respect to the process of squaring the four digit number 5374, but is applicable to any number.

Figure 6:
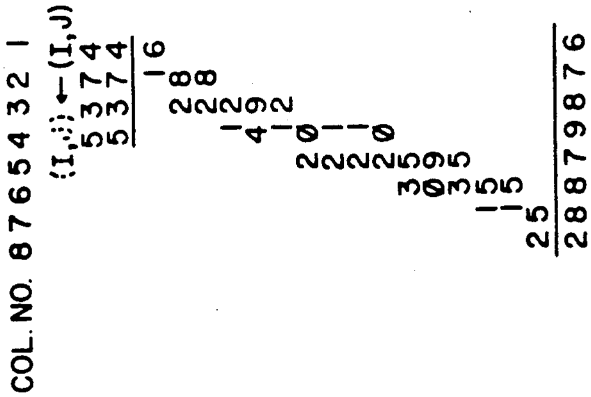
FIG. 6 illustrates the reiterative multiplicity routine for decreasing the lock memory and the lock computation required to square the encoded message x.

Referring to FIG. 6, for convenience the computational columns are numbered 1 through 8 and the pointers I,J are used much as would be used in implementing the algorithm in the computer. Initially, the computation starts with the pointers I,J together in column 1, then I is moved to the left column-by-column to the last column of the number x (column 4 here), and, finally, J is moved to the left column-by-column to the last column. After each move of the pointer I or J, a summation of cross products is obtained for the columns encompassed by I and J (1) Where I and J span an even number of columns, n, the sum of the cross products of the columns spanned by I and J is obtained. (2) Where I and J span an odd number of columns, the square of the middle column is obtained and added to the sum of the cross products of the outer columns, if any. (If the number spanned n=1, there are no outer columns.)

This procedure is readily understood with reference to FIG. 6 wherein I,J both initially are at column 1 and the associated column subtotal is simply $4^2$ or 16. When I is moved to the second column (I=2 and J=1), the two pointers span an even number of columns and the column subtotal is $(4\times7=28)+(7\times4=28)$ or 56. Please note, in each case where the cross products are obtained, two equal values such as 28,28 are obtained and the computations can be reduced by simply multiplying the cross product such as 28 by 2.

Continuing with our computational routine, next, I is moved to column 3 (I=3, J=1), providing the associated column subtotal of $(4\times3=12)+(7\times7=49)+(3\times4=12)$. The process continues until first I is moved to the far left column and then J is moved to that last column (I=4, J=4), providing an associated cross product of $5\times5=25$.

The squared result is obtained by simply adding the columns.

Please note, at any one time the process requires a maximum amount of scratch memory equal to twice the number of bytes occupied by the unsquared number x, plus just 6 extra bytes. Thus, the algorithm allows a computation of a very large number $x^2$ using the same RAM scratch storage that is required to store the large number x, plus 6 bytes, and also reduces the number of multiplications for obtaining an $x^2$ of 111 bits by nearly half, from about 2100 to 1100. This decreases the overall computing time by about 25 percent, from about 0.5 seconds to 0.365 seconds.

C. Flexible Protocol and Operations

Flexible protocol is an outgrowth of the use of digital signature-type public key cryptography to encode the message area of a magnetic card. As described above, the digital signature approach provides excellent security. In addition, encoding the data message area using the digital signature approach separates the security validation function from the message function. This frees the protocol from the program limitations of simultaneously serving message and security functions. One example of such a constraint is found in the above discussed sequencing problem in which valid guest cards are unable to operate a lock following the lack of use of a previous card or cards.

1. Card Organization

Figure 7:
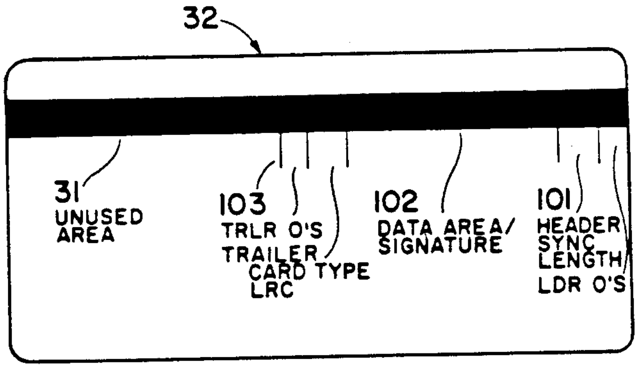
FIGS. 7, 8 and 9, respectively, depict an exemplary magnetic card, the organization of hexadecimal information on the card, and the organization of the data area.
Figure 8:
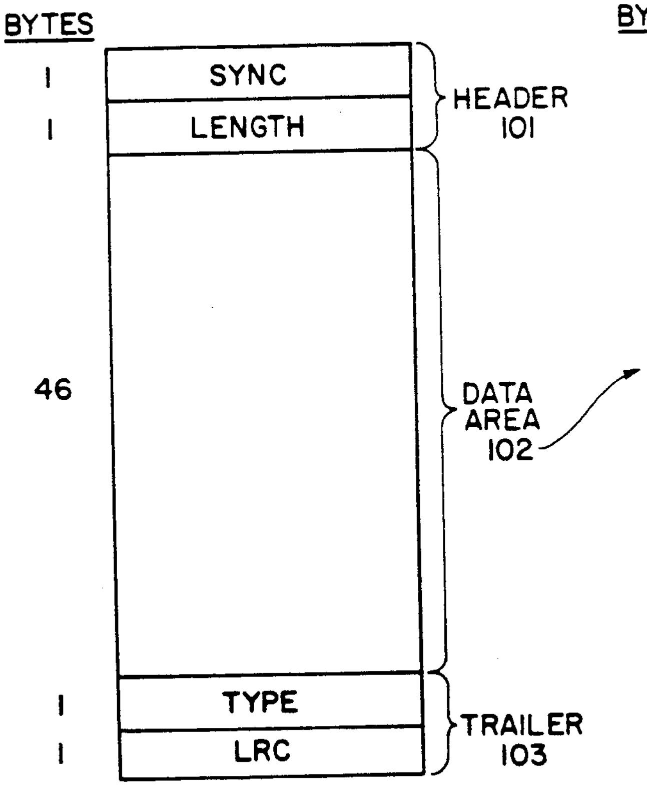

Referring to FIG. 7, in implementing the flexible protocol, magnetic cards 32 are used having magnetic stripe 31 on which 50 bytes of data are written in hexadecimal notation. Referring also to FIG. 8, the 50 data bytes are divided into a two byte header 101, a data area 102 which is a dedicated 46 bytes and a trailer 103 of two bytes. The card is read from right to left, from preheader zeros through post trailer zeros. The first byte of data on the card is the one byte sync character in the header, which instructs the lock to read and parse the following data. The second byte of data, in the header, is the length specifier, currently the number 48, which specifies the number of data area and trailer bytes on the card and provides for future expandability of the card. For example, at present the length is set to 48 (hexadecimal $30), the maximum length the presently-used lock microprocessor 51 can handle.

The trailer 103 comprises single bytes for card type and an outer LRC (longitudinal redundancy check). The card type, the 49th byte, presently specifies one of six different card types: factory start-up; construction start-up; full operation start-up; signed card (set-up, programming or key); self-test; or dump Audit Trail. The 50th byte, the one byte outer LRC, is used to verify that the data is read correctly at the lock.

While some cards need not be signed, the flexibility of our protocol is perhaps best illustrated by those cards—including key and programming cards—in which the data area 102 is encrypted as a digital signature. Specifically and referring to FIG. 9, the key and programming card protocol locates certain information in the data area 102 of each card in the same bytes. Presently, the cards provide one byte for common area flags, four bytes for card I.D. number, two bytes for common area sequence numbers one byte for common area negative bridge (below), 36 bytes for the messages field, one byte for validation LRC and one byte for various flags.

The common area flag bytes specify a limited common access area. Presently, bits 0 through 3 allow a card access to none, some, or all of a possible four limited-access common areas.

The card I.D. number contains a four byte number, unique to the key, one of four billion numbers which are assigned in numerical order by the console to the guest or employee to whom it is issued.

It should be noted that common areas are those information fields which are designed to provide wide access by a number of keys to a given lock or locks applied, e.g., to garages, pools, public restrooms, etc. The common area sequence number is changed automatically at the console on a fixed time cycle such as daily. As is the case with guest room and employee sequence numbers, if the common sequence number on the card is equal to the number in the lock, $S_C=S_L$, the door is opened. And as is the case with guest room employee sequence numbers, if the common sequence number on the card is greater than the number in the lock by a difference not greater than the sequence bridge b $(b\geqq(S_C-S_L)>0)$, then not only is the door opened, but the sequence number on the card is stored in the lock as its number. Unlike the conventional approaches discussed above, this sequencing technique permits a valid card to operate a lock independent of the use/non-use of previous cards, so long as the arbitrarily selected bridge length is not exceeded. As mentioned, this flexibility is made possible by separating operation of the card and lock protocol from security function. The arbitrary bridge number b can be 1 or 10 or 255 or any number which provides the desired system flexibility.

Unlike guest room and employee sequence numbers, if the common sequence number on the card is less than the number in the lock by a difference not greater than the common area negative bridge specified on the card $b_c$ $(b_c\geqq(S_L-S_C)>\phi$, then the door is opened. The common area access expires automatically when the difference between $S_L$ and $S_C$ exceeds the common negative bridge number $b_c$. The common area negative bridge number is set up similarly to the bridge number except that the negative bridge is specified in the one byte common area negative bridge.

Consider, for example, a guest with a common area negative bridge number of 10. When the guest uses the swimming pool on the first day of his stay, the door opens. If he is the first of that day's guests to use the pool, then the sequence number on his card will be greater than the number in the lock, so the lock will be updated to the new number on the card. The following day, after the lock has been used by guests checking in that day, the sequence number will have been advanced again. But our guest's card will still get him into the pool because, while his card has a sequence number which is less than the lock's, the difference is 1, which is less than the negative bridge of −10 on his card. Our guest's card will unlock the pool for ten days, as long as his card sequence number is less than the pool lock sequence number by a difference not greater than the negative bridge of 10 on his card.

The 45th byte in the data area 102 is a one byte inner LRC (longitudinal redundancy check) which proves the validity of the data. That is, this inner LRC is used to determine if the card as unsigned is valid. The previous 44 bytes are exclusive-ored with the LRC and a zero result is required for the data to be valid. If not, the card is assumed invalid and is rejected by the lock.

The last, 46th byte in the data area is used for such things as controlling audio and low battery feedback and specifying whether the card is a set-up or a key/-programming card. In addition, the two lowest bits of the 46th byte are used for quadratic residue control. The low bit is always zero and the next bit is always 1 so that the data area is a 46 byte even number congruent to 2 mod 4, which facilitates unsigning the card.

D. Programming and Key Cards

1. Message Field Data

Figure 9:
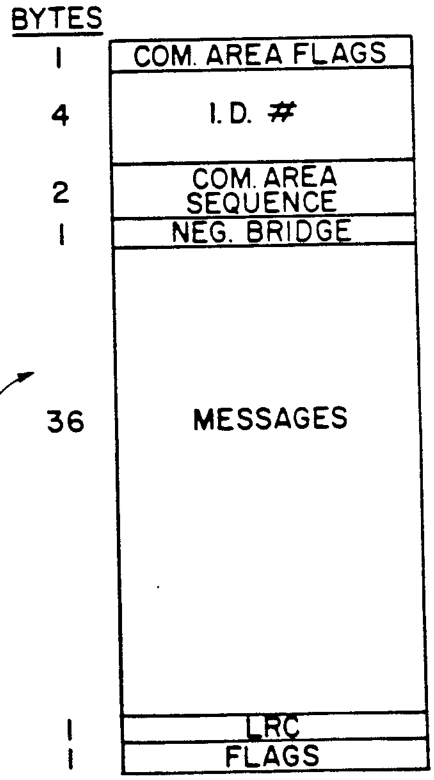

The 36 byte message field 104, FIG. 9, communicates to the lock the one or more functions it is to perform. As illustrated schematically in FIG. 10, the lock microprocessor and memory are designed to receive card messages constructed from submessages: one or more Actions preceded by an optional or required Area/Sequence, Lock number, and/or Time specification. A one byte EOM end of message code is employed on the card where the 36 byte field is not filled.

An Area/Sequence pair is an Area with an associated Sequence number and is required to validate most actions. The message field will encompass 32,640 possible areas such as single or multiple door guest rooms, suites, etc.

Figure 12:
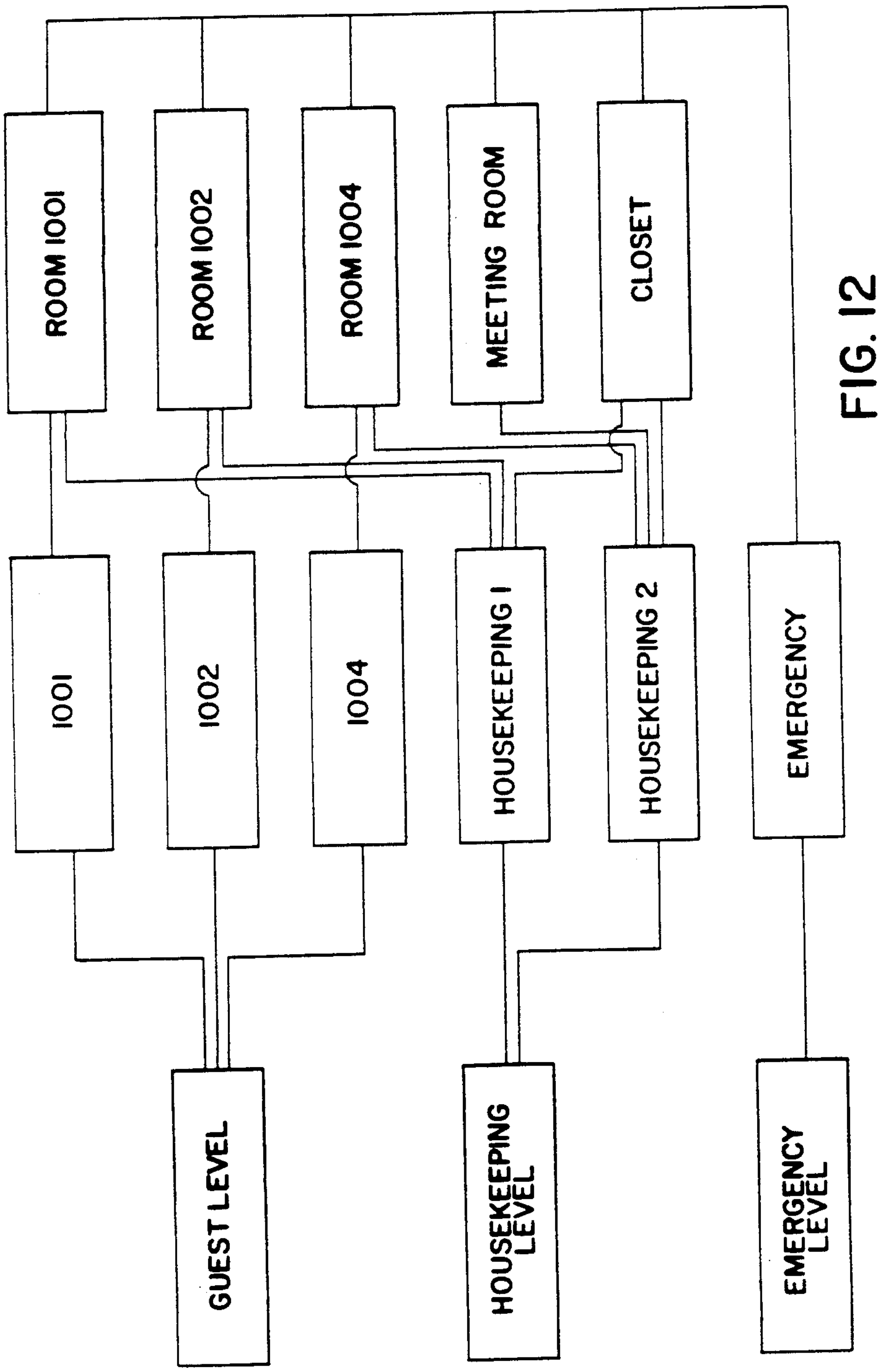
FIGS. 12, 12A, 12B, 12C and 12D depict the relationship between master levels, areas, and lock keying.
Figure 12A:
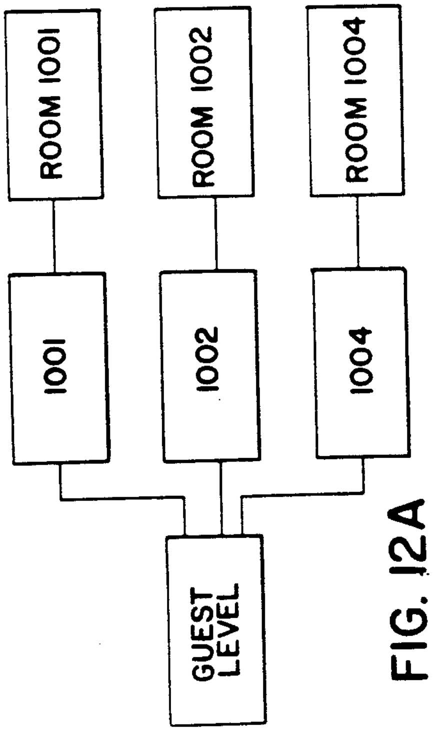
Figure 12B:
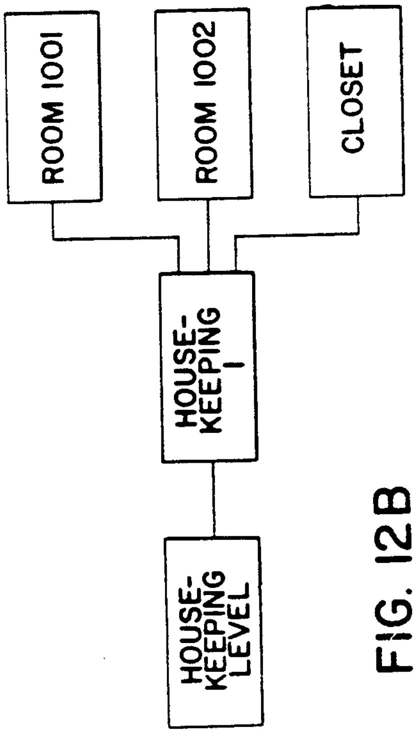
Figure 12C:
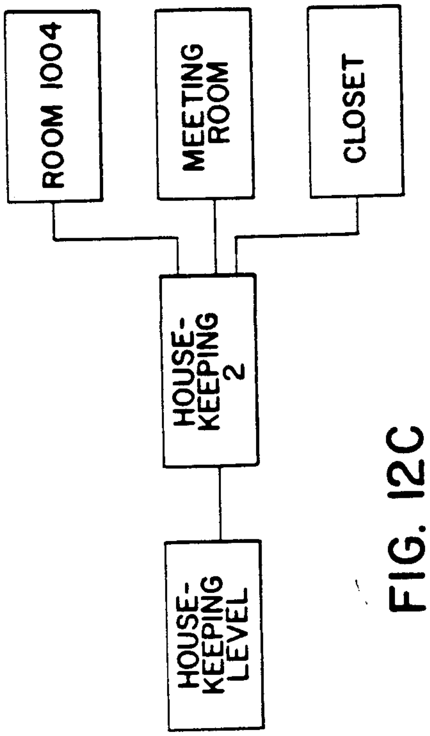
Figure 12D:
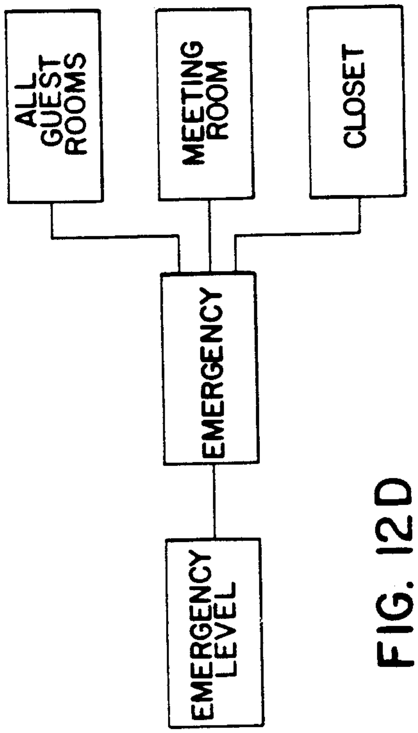

As used here, "area" means a collection of one or more related locks, all of which can be opened with the same Area/Sequence pair. As illustrated schematically in FIG. 12 areas are used to designate a collection of related locks.

In turn, master levels refer to a collection of related areas. Presently, the locks can be programmed to respond to up to nine areas or master levels. The use of master levels in conventional locks is limited to several fixed, designated locks or lock groupings and each lock is limited to a selection from among this number. Using the present protocol, however, a very large selection of levels (approximately 32,640) is available.

Specifically, regarding the Area protocol. An area low byte of zero is not allowed on a card; the 128 such possible areas are reserved for lock use. The low 15 bits of the 16 bit area field specify the area itself. There are thus 32,640 possible areas specified by the 15 bits. Each area in use has an associated current sequence number. The organization of the types and numbers of doors is defined by the management at each site. While a guest room with one door represents an area of one lock, the emergency area is made up of most or all the locks in the hotel or system. In both cases, a single sequence number is associated with each.

Bite 14, the highest bit in the area (the second highest bit in the area field), specifies whether the area is for guest or employee access. If this bit is set, the area is considered to be an employee area. If the bit is clear, the area is considered to be a guest area.

As mentioned elsewhere, the first area of all locks is the emergency area. It is never removed and does not have a one-time counter. A valid emergency key can open any lock provided there is only a single emergency area or, if there are more, emergency level Area/Sequence pairs, all sets are on the emergency key. If the emergency area's high bit (bit 15) is set, this indicates deadbolt override, all locks are programmed to open at any time regardless of the position of their deadbolt on the door or regardless of the presence of a high security state. If the deadbolt override bit is not set, however, then the card cannot open the door if locked by a deadbolt or any high security state.

Guest areas also get special handling. Only a guest area sequence update will reset a high security state (discussed elsewhere) and while there can be multiple guest areas programmed into a lock, only one can be active at any particular time—the others are locked out. Updating the sequence of a guest area makes it the active guest area and locks out all others. A locked out guest area can also be made active by the use of a reset lock-out operation.

Bit 15, the highest bit of each area field on a card, specifies override of the deadbolt. When bit 15 is a one, the key will open the door even if a high security state exists or even if the deadbolt has been thrown from the inside, as was illustrated by the emergency key above. When a bit 15 on an area is zero, the card will not open the door if a high security state exists (unless the Action is Set High Security/Open, discussed below) or the deadbolt has been thrown from the inside.

The 2 byte Sequence number is paired with the Area number to validate most actions the lock can take. When an Area/Sequence pair validates an action such as "open the door", the lock firmware compares the pair to the Areas and Sequences currently stored in the lock. See the exemplary lock memory organization in FIG. 11. If it finds an Area has been programmed into the lock, it then compares the Sequences. If the Sequence number equals the Sequence number already in the lock at the specified Area, then the lock will execute the desired action. If the Sequence read off the card is greater than the Sequence in the lock in that specified area and the difference between the two is not greater than the bridge value, then the lock also executes the desired action and, if the action validated is one of five key actions (open, set high security/open, one-time open, unlock or relock) or is an update sequence programming action and the rest of the message and message field are valid, the desired function performed and the Sequence number is updated. This means that the card sequence number replaces the sequence number previously programmed into the lock. In this way, old keys are automatically invalidated each time a new key is used on each lock for each area.

Note, however, that only the specified actions will update the lock sequence. Should the first Action not be one of the specified ones, the Sequence will not be updated by this message. In addition, several Area/Sequence pairs may be specified on a single card. Also, it should be noted that the present capacity of the lock allows up to eight Areas/Sequence pairs on each lock. If fewer than eight are specified some may be conditioned by a Time spec option. Should two or more Areas/Sequence pairs be specified and one matches the corresponding lock exactly while another would update the sequence, then updating takes place regardless of the match at the other area. Should there be two or more Area Sequence pairs on a card which would update the corresponding sequences in a lock, all are updated.

The Lockno (lock number) is a 2 byte number which is assigned by the console to each lock and in no way relates to the room number on which the lock installs, and uniquely identifies the lock.

The Timespec (time specification) is effective when an optional clock/calendar board is provided for a lock and allows cards to be valid only during specific dates and times or on certain days or both.

The clock/calendar board is an optional board for each clock. Connected, it provides capability for increased security: cards can be limited to be valid only during specific dates and times or on certain days or both and transactions are logged within the lock. Two Opcodes can be provided for setting the correct date, day and time into the clock/calendar chip. Other Opcodes are provided for validating and limiting card actions.

Timespecs can be written into messages on cards to limit the validity of an operation to certain dates or times. The lock will compare the day/date/time in its own clock/calendar to the times on the card to determine the validity of an operation.

Timespecs can consist of one or more Timespec Opcodes, each followed by one or more day/time Operands. Normally, only one Timespec Opcode will be used. A second may be called for if the Operand portion of the Timespec is longer than the 15 byte length this Opcode can specify. In that case, a second Opcode is used to continue the Timespec.

E. Card Actions

A card can perform two actions: program the lock with one or more functions and open the lock. The possible different types of keing actions include simple Open (any lock with matching combinations at the specified master level); Set High Security/Open; Unlock (create a passageway door); Relock (a passageway door); and One-Time Open (for a maintenance or delivery person, etc.). The programming actions include Set Clock to date/time/day; Clear common area; Lock-out one or more master levels of keys; Reset Lock-out; Update Lock Sequence Number to the current value; Add Area (accept additional keys); and Remove Area. These are discussed below.

1. Open Actions a. Open

This data submessage opens the lock if the validating optional Lockno and Timespec match the lock's data and if the validating Area/Sequence bridges or matches.

Exceptions include: (1) if the lock's deadbolt is thrown, the deadbolt override bit in the Area must be set or the door will remain unopenable by the card; (2) if High Security is set and validation is by a guest area which does not update the sequence number, the deadbolt override bit in the area must be set or the door will remain unopenable by the card; and (3) if the validating Area is locked out and does not update the Sequence number, the door will remain unopenable by the card.

An open action updates the sequences associated with all validating Areas which bridge. Successful sequence updating resets any lockout at the area being updated, as well as, if the area being updated is a guest area (bit 14 clear), resetting the logical deadbolt (see High Security below).

b. Set High Security Open Action

This action is the same as the Open Action, except that the card's first action is to throw a "logical" deadbolt. Once thrown, the only cards which will open the lock are ones with a Deadbolt Override bit set or with a Set High Security/Open action on them or ones which update the sequence associated with a guest area (bit 14 clear). While any key can set the High-Security state, only a guest key (area bit 14 clear) can reset it upon sequence updating.

c. Unlock Action

This key makes a door act as an open passageway until a Relock key is used to relock it.

Exceptions include: (1) if the lock's deadbolt is thrown, the deadbolt override bit in the Area must be set or the door will remain unopenable by the card; (2) if High Security is set and validation is by a guest area which does not update the sequence number, the deadbolt override bit in the Master Level byte must be set or the door will remain unopenable by the card; and (3) if the validating area is locked out and does not update the sequence number, the door will remain unopenable by the card.

d. Relock Action

This key relocks a door acting as a passageway and updates the sequences associated with all validating areas inclined to need updating, provided the other preconditions to updating a sequence listed in Open (Open Action) are met.

e. One-Time Open Action

This key opens a lock for one time only the conditions for opening are the same as for Open (see Open Action) except: (1) The counter which is in the one time operand must be higher than the 1-byte counter in the lock corresponding to the area which would open the lock; and (2) if there is a clock in the lock, a required validating time must be valid. Any resequencing necessary is executed prior to validating the one-time counter (on a key that resequences, the counter is automatically valid, since updating the sequence zeros the lock's one-time counter at that area).

If the lock validates (regardless whether it opens), then the counter in the lock is set to the counter on the key, thus preventing the key's reuse, as well as preventing use of any one-time keys issued prior to this one (with lower counters in their operands). The counter in the lock is sequenced even if the door is not opened (due to the deadbolt being thrown and no override, for example, or lockout of the validating area).

There is one counter byte per area in the lock, except at the Emergency Area (the first area added by the Setup Card, so that Area cannot be used to validate this key.

2. Card Programming Actions a. Set Clock Operation

The Set Clock operation is validated by prefacing the operation on the card with any Area/Sequence which is also in the lock. The lock's clock is set to the date, time, and day of the week which are specified in the operand.

b. Get Time Portable Terminal Operation

If a lock can communicate with a portable terminal for Audit Trail purposes, then the portable terminal can also be used to set the date, time, and day in the lock.

This works as follows: the portable terminal downloads the date, time and day of the week, as well as a lock communications program, from the Console; the portable terminal is connected to the lock; the Get Time card is run through the lock's car reader; the lock validates the card against the Area/Sequence on the card, as well as by the one-time counter on the card at that area; the lock responds by reading the date, time, and day of the week from the portable terminal via its serial port.

c. Set Common Area Operation

This operation converts a lock to Common Area access and gives it a Common Area Sequence to respond to and, optionally, times for Common Area accessibility. This operation requires that the message contain the valid Lockno and any valid Area/Sequence in the lock. A Timespec is also required (though only used by locks with clocks).

The lock's common area access levels are set to match the four common area flags in the card's flag field. If none of the four flags is set, the lock's unlimited common area access flag is set to indicate that any valid site key with a valid common area sequence number will open the lock.

The lock's Common Area Sequence number is replaced by the common area sequence number on the card. Set Common Area also includes the option of setting one set of hours during which common access will be allowed and/or one set of days on which common access will be allowed (if both are specified, then both must be true for the lock to allow common access).

d. Clear Common Area Operation

The Clear Common Area operation removes all common access to a lock. This operation requires that the message contain any valid Area/Sequence in the lock. All of the lock's common area access flags and sequence and time information are cleared by this operation.

e. Lockout Operation

The Lockout operation locks out the areas specified in the operand. It is validated by the Area/Sequence specified.

A lockout can be reversed in one of two ways:

A key which updates the Sequence associated with an Area in a lock will reset the Lockout at the updated Area. (If this is a guest Area, the updating procedure also automatically sets a lockout on all other guest Areas.)

A Reset Lockout card (see Reset Lockout Operation) will reset specified areas which have been locked out.

f. Reset Lockout Operation

This card resets the Lockout installed with a Lockout Operation Lockout card, resetting lockouts at the areas specified in the operand, validating the card against any Area/Sequence pair in the lock.

g. Update Sequence Number to Current Value Operation

Update Sequence is the only programming card to execute the update-sequence routines in the lock. It differs from an Open key (Open Action) mainly in that it does not ever unlock or open a door. Its purpose is solely to update the sequence in a lock so that previous sequences are locked out without having to also open the door at the same time.

If the Emergency Key had to be changed due to the loss or theft of one, an Update Sequence card could be run through every lock in the hotel by a low-level employee, who need be trusted only to use it on every lock, not to not steal it himself or make copies of it (since it doesn't open the door, it has no theft or loss risk). And guests would not be disturbed by the sound of their door being opened merely for the purpose of updating its sequence.

h. Add Area Operation

Add Area adds the operand's Area/Sequence pairs to the lock. If a lock already has an Area to be added, or if all lock Area storage is already in use, the entire message field is ignored and lights are blinked to signal an error condition.

Required for validation is any Area/Sequence pair.

i. Remove Area Operation

This operation removes from the lock the Areas specified in the operand. However, the Emergency Area cannot be removed from a lock; attempting to do so invalidates the entire card.

F. Other Flexible Protocol Features

1. Upward/Downward Compatibility

The present flexible protocol is designed so that individual submessages within the 36 byte messages field, including Area, Sequence, Lockno, Timespec and Actions, each include an Opcode (operations code) which occupies a specified length according to its type and the type of Operand. The length as well as the type of Operand is specified by the Opcode. Thus, in specifying its own length and the length of the Operand, the Opcode completely specifies the total length of the associated submessage. This provides upward and downward compatibility between old and new locks and cards.

For example, if new locks are added or locks are modified to have capabilities not present in existing locks, the old locks will nonetheless be operated by keycards containing the new submessages despite the inability of the old locks to understand and carry out the new submessages. This downward compatibility between new cards and old locks and between old and new locks exists because, where the old lock does not have the capability to understand or implement the new submessage(s), it can simply skip over the predetermined length of the new submessage(s) to the next message which is within its program capability.

The system is also upwardly compatible in that new locks readily implement all the instructions for old locks contained in the old cards. To the extent new locks might not be programmed to implement a particular old submessage, they, like the old locks, merely skip over the particular submessage(s) to the next submessage they are programmed to implement.

In short, as long as the old and new cards understand one another's opcodes, complete downward as well as upward compatibility exits, permitting the mixed use of the old and new locks, new cards with old locks and vice versa.

2. One Time Key

Figure 11:
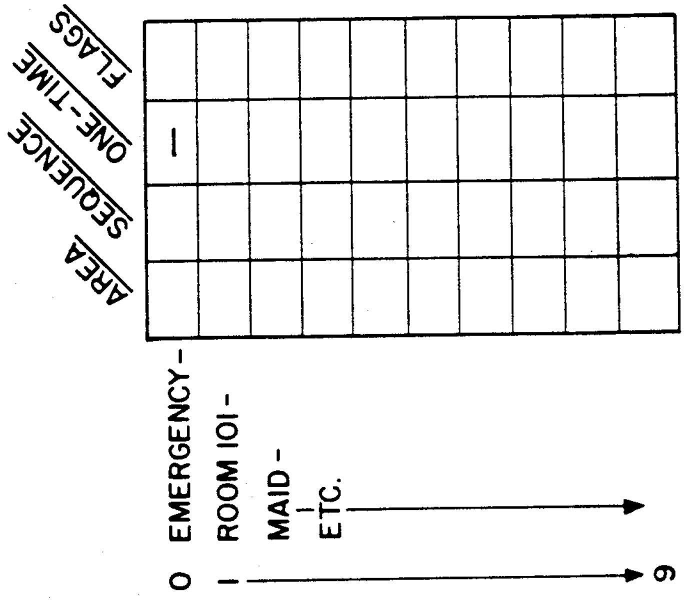
FIG. 11 schematically depicts a lock's level organization.

Another direct off-shoot of the use of flexible protocol is the ability to issue so-called one-time keys which permit entry to a designated area 2 through 9 (excluding emergency, of course) of delivery personnel such as a florist, and the like. As shown in FIG. 11, the look-up table in each lock has a One-Time field therein which is validated by Area and Sequence and, optionally, by Timespec. Each one-time card contains a particular area and sequence and also contains a one-time numbers issued in sequence. Each lock is programmed to open if the sequence number on the one-time card is greater than the lock's one-time sequence number and then to replace its one-time sequence number with the card's number. Thus, each new use of a properly sequenced one-time card locks out all previous One-Time cards whether properly validly issued or not.

For example, if the hotel front desk issues a first One-Time card to room 201 to a florist, then issues a second card to a telegram delivery person, then issues a third card to a grocery delivery person, and the grocery delivery person proceeds directly to the particular room 201 while the florist and telegram deliverer delay, the use of the third card locks out not only that card but also all previous cards, even though previous cards may not have been used.

A lock containing the enhanced clock/calendar option board may further limit the card to Timespecs covering, for example, particular time periods. Furthermore, One-Time cards can be set up for any or all of the levels 2 to 9 of an individual lock, conditioned only by the requirement that they be properly issued in accordance with the then current sequence for the different levels.

3. Multiple Access; Combining Programming and Actions

The ability to program multiple submessages onto a given card in effect make the card a key ring on which each represents a key.

In addition, programming functions and key actions can be combined on a single card and can be validated by the same or different areas.

G. Electronic Lock Control Circuit

Figure 10:
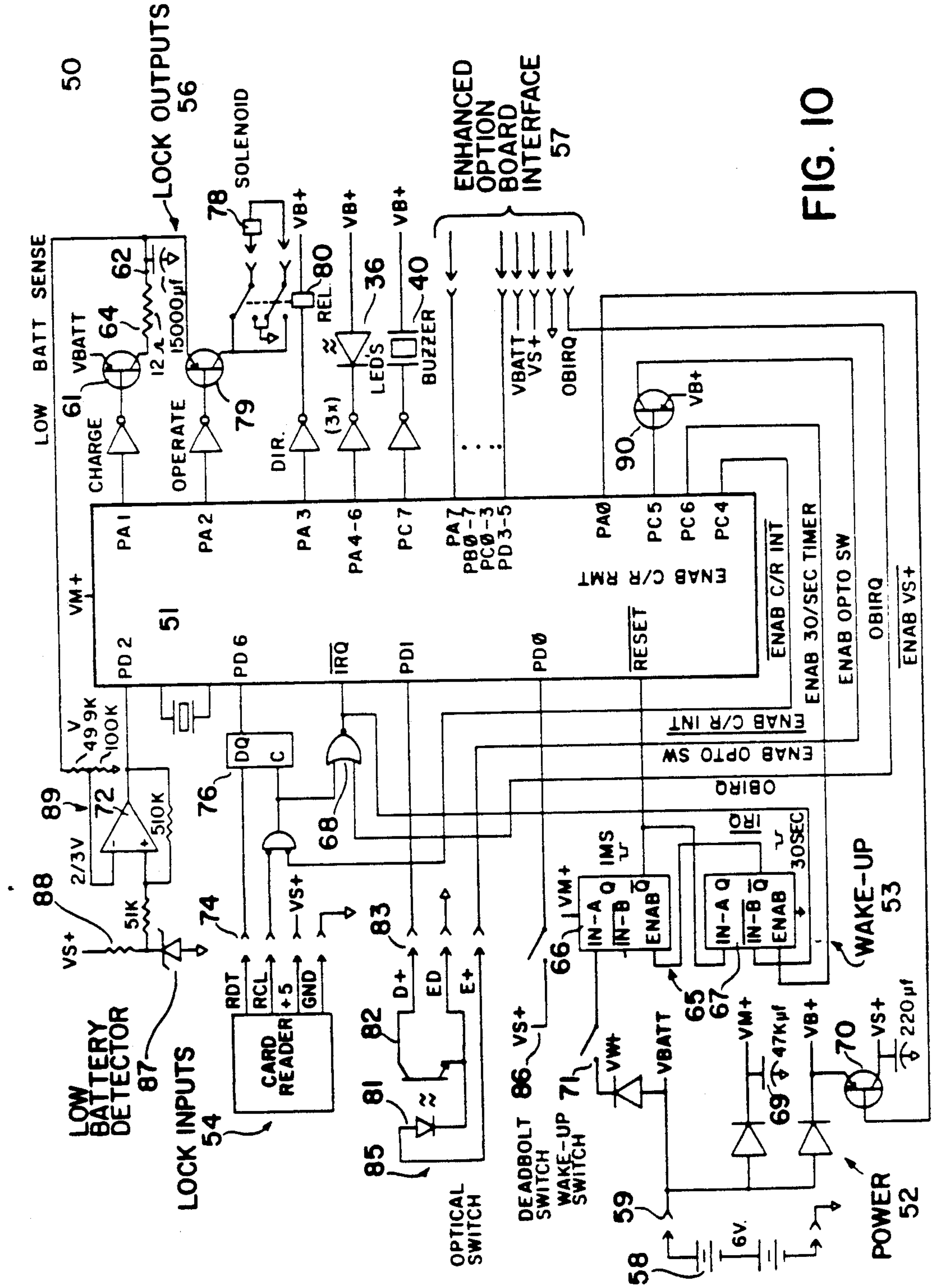
FIGS. 10 and 13 are schematic diagrams of the control circuits used in the electronic lock.

As shown in the schematic of FIG. 10, the main control circuit 50 for the electronic lock 30 comprises a microprocessor 51 and five main sections which interface to the computer: power circuit 52; wake-up circuit 53; lock inputs 54; lock outputs 56; and an interface 57 to an enhanced option board.

The lock is designed to work with microcomputers such as the HD6305VO or the 68HC05C4, which are essentially identical, include 4096 bytes of ROM and 192 bytes of RAM, and have four parallel IO ports: PAO-7, PBO-7, PCO-7 and PDO-7. The power circuit 52 depicted in the lower left hand corner of the figure includes a six volt power source 58 preferably in the form of lithium or alkaline batteries which are connected via jack 59 to the microcomputer 51 and the other sections of the control circuit. When asleep (clock not running), the microcomputer 51 operates on very low power, of the order of 10 μA (microamperes). The power circuit 52 is divided into five power buses, VBATT, VW+, VM+, VB+ and VS+, for the purpose of providing a long life to the battery power source 58 to retain the contents of the microcomputer's RAM memory when batteries are removed or worn out. This is done primarily to maintain the microcomputer's audit trail record. Please note, because a "computer" contains a "processor", the two terms may be interchanged at times herein, particular microcomputer 51 may be referenced as microprocessor 51 where it is the processor function which is being discussed or emphasized.

Power bus VBATT feeds directly to transistor 61, which is connected to a large capacity capacitor 62 for charging the capacitor to the battery voltage. Presently a 15,000 μF (microfarad) capacitor 62 is used. As described below, the capacitor 62 is used to pulse a solenoid 78 for effecting locking and unlocking of the latch 33, FIG. 4.

The second bus, VM+, supplies power to the microcomputer 51, the wake-up circuit 53, and the low power CMOS integrated circuits such as 66, 67 and 68. The VM+ bus is powered off a large capacitor 69, for maintaining power to the microprocessor 51 to maintain the RAM memory thereof for at least ten hours in the event the batteries are removed or malfunction.

The third bus, VW+, supplies power to the wake-up switch 71 for selectively activating the microcomputer 51 for a predetermined time to read and implement the card instructions and operate the lock 30. During a condition of battery removal or malfunction, it is necessary to maintain the microprocessor in its quiescent, "asleep" state to minimize the power drain and thereby maximize the length of time that the capacitor 69 can maintain power to the microprocessor. The wake-up circuit 53 is configured to prevent activation or waking up of the microprocessor 51 during this time. VW+ has no holding capacitor and is diode isolated from the other bus (the emitter of transistor 61 acts as a diode for this purpose).

Bus VS+ is used to drive the high current devices that do not have separate switches (that are not individually controlled) such as, for example, lock card reader and the low battery detector circuit. Bus VS+ itself is connected by line ENAB VS+ to microcomputer output PAD for switching the bus voltage on and off.

Finally, the VB+ bus drives status LED's 36, buzzer 40, and relay 80.

As mentioned, the operation of the microprocessor 51 is initiated by the wake-up circuit 53 by the act of inserting the card 32 into the lock card reader. As the card 32 is drawn down the slot 38 of the reader, FIG. 4, wake-up switch 71 is closed to apply the voltage from the VW+ bus to the IN-A input of the upper half 66 of monostable circuit 65. The upper monostable circuit 66 provides a constant one millisecond pulse when it is operated and drives the RESET microcomputer input to reset the microprocessor awake. Lower circuit 67 of the monostable 65 is designed to have a second time period, such as 30 seconds, which is longer than the longest time that the microprocessor is active before returning to is quiescent state.

The interconnections depicted between the upper and lower monostable circuits and the microprocessor 51 are configured so that when wake-up switch 71 pulses the upper monostable circuit 66 the one millisecond pulse on output pin $\bar{Q}$ is supplied to the microprocessor RESET pin and is also applied to input IN-A of the lower monostable circuit 67, thereby triggering the lower circuit to generate its 30 second pulse at its output $\bar{Q}$. This latter pulse is applied back to input pin $\overline{ENAB}$ of the upper monostable circuits to disable the upper circuit, that is, to inhibit the upper circuit from firing again. The upper monostable circuit 64 is disabled for the 30 second duration of the output pulse on the bottom half, that is, as long as the bottom circuit is still timing, and the microprocessor cannot be inadvertently reset during this period.

Just before the microprocessor returns to its quiescent state, it provides an output pulse ENAB 30 SEC TIMER via output PC6 which is applied to the ENAB input of the lower monostable circuit 67 to reset that circuit which in turn reenables the upper monostable circuit 66.

To summarize, then, the wake-up circuit 53 provides three important actions. First, the upper monostable circuit 66 activates or resets the microprocessor 51 when a card is drawn down the lock reader. Second, the bottom monostable circuit 67 disables the top circuit from additional reset operations for a predetermined time following this initial reset operation to allow uninterrupted microprocessor operation. Third, the microprocessor itself provides for the override of this disable condition at the end of a cycle of operation. As a consequence, the closure of the wake-up switch 71 (by the insertion of a card) can activate the wake-up circuit 53 to reset the microprocessor 51 to start another cycle of operation or to terminate the unlikely occurrence of spurious operation.

The lock inputs 54 include a card reader interface 74 between the lock card reader and the microprocessor 51. Latch 76 temporarily latches the incoming data to allow more time in getting out to the bits, so that they may be done in up to one bit time later.

Latch 33, FIG. 4, is operated by a magnetically-held clutch (not shown). The solenoid 78, FIG. 10, is pulsed reversibly by discharging the capacitor 62 through a power transistor 79 under the control of relay 80. In its normal, inactivated state, the relay 80 sets the polarity of the solenoid 78 to unlock the door. When actuated by DIR pulse from the microcomputer output PA3, the relay 80 reverses the polarity to release the solenoid for relocking the door.

Since the door is not automatically relocked, it is very important for the microcomputer to know when the lever 41 has been operated and released so that it can effect reverse pulsing of the clutch to release the clutch and relock the door and thereby prevent unauthorized entry. This sensing function is performed by an optical switch 85 which is mounted in the lock 30 and comprises an infrared light emitting diode 81 and a phototransistor 82 which are connected by jack 83 to the microcomputer. The output PC5 of the microcomputer 51 controls the operation of driver 90 applying an enabling pulse over line ENAB OPTO SW to activate the LED 81. The LED 81 and transistor 82 are positioned so that infrared radiation from the LED directed to the phototransistor is normally interrupted by the lever 41. However, when the lever is pivoted to open the lock, it is removed from the path of the infrared radiation and the incident radiation causes the transistor 82 to generate an output signal which is applied to input PD1 of the microcomputer, causing the microcomputer to energize relay 80 to disconnect the clutch from the lever 41. Deadbolt switch 86 simply monitors the throwing of the deadbolt 34, FIG. 4, on the lock and inputs this status information to the microprocesor at PDO.

The lock output circuit 56 includes the outputs PA1-3 for effecting the previously mentioned solenoid operation. In addition, outputs PA4-6 are used to light the status LED's 36 and PC7 is used to effect the operation of the buzzer 40.

The charging voltage applied to the capacitor 62 by the transistor 61 is monitored by a LOW BATT SENSE lead connected to the inverting input of comparator circuit 72 which is configured very similarly to an operational amplifier. Zener diode 87 provides a stable reference voltage of, for example, 3.3 volts to the non-inverting input of the comparator 72. The charging voltage over the LOW BATT SENSE line is applied to the non-inverting input via voltage divider 89 to apply a voltage to the inverting input which is ≧ the voltage at the reference input when the charging voltage is ≧ a desired threshold level (minimum battery voltage). Thus, the output of the comparator 72 is applied to the microprocessor input PD2 and is used to sense a low battery condition, true or not true.

Actually, the output is used in two different ways. First, it is used to monitor at any given time a charge on the capacitor 67 so that the microprocessor 51 can maintain the capacitor in a fully charged state. This provides instantaneous solenoid operation when a card is drawn through the lock reader. Secondly, the amount of time it takes to charge the capacitor 62 provides an indication of the charge state of the battery. The charging time of five RC, where RC is the time constant provided by resistor 64 and capacitor 62, normally provides a 99 percent charge on the capacitor using a normally charged battery. Thus, if the charge time determined by the microcomputer 51 exceeds five RC, a low battery condition is indicated and the batteries should be replaced.

H. Enhanced Option Board

Figure 13:
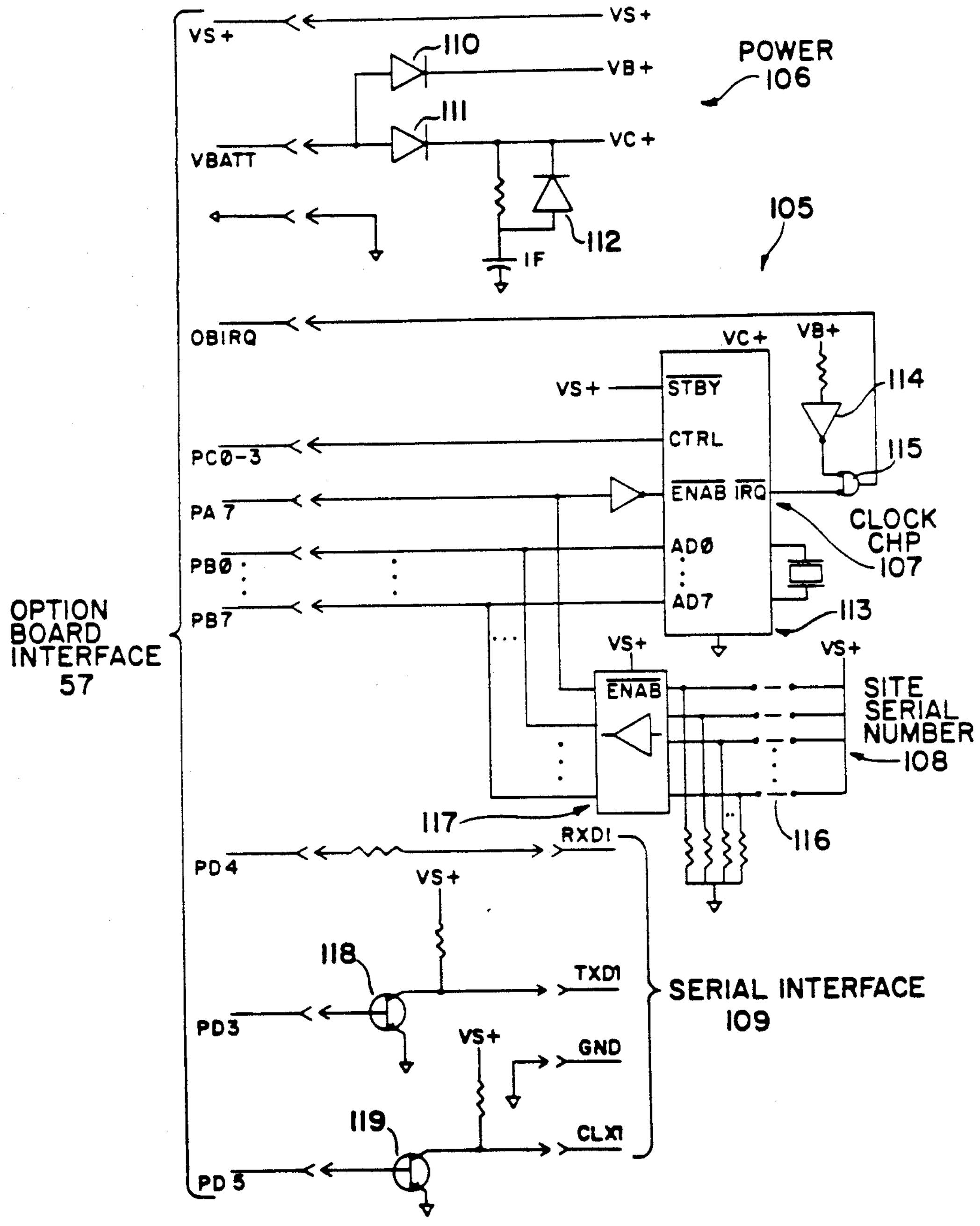

The schematic of FIG. 13 depicts an optional clock/calendar enhanced option board 105. This board plugs into the main control circuit 50 by way of the enhanced option board interface 57, and adds additional features and capabilities to the electronic lock 30.

The enhanced option board interface 57 is general purpose in that several different types of option boards, including but not limited to clock/calendar option board, bi-directional infra-red interface, and elevator interface can all be plugged into the main circuit board 50 without any changes to the latter.

The clock/calendar option board 105 is comprised of four sections: power circuit 106; clock/calendar/CMOS RAM 107; site serial number 108; and serial interface 109.

Each option board derives its power from the main control circuit 50 via option board power leads VBATT and VS+. On the clock/calendar enhanced option board, VBATT is split into two buses VB+ and VC+, which are diode isolated via diodes 110 and 111. VB+ is powered only if VBATT has power, i.e., when batteries 58 are plugged into the main circuit board. VC+ has a large (1 farad) holding capacitor 112 to maintain backup power to the clock/calendar/CMOS RAM 107 even if the batteries are removed up to ten hours or more. Power bus VS+ is enabled by the microcomputer 51 via transistor 70 on the main circuit board, and is off when the microcomputer is asleep.

The clock/calendar/CMOS RAM circuit 107 uses a commercially available integrated circuit 113 to provide timed functions for the lock, and to date and time stamp and store vp to nine Audit Trail entries i its 50 bytes of CMOS RAM.

The clock/calendar/RAM chip is normally in a "Standby" mode when the lock is asleep, due to VS+ low causing the STBY pin to be asserted low. When the microcomputer "wakes up", it pulls VS+ high, enabling the other I/O pins of the clock/calendar chip the site serial number circuit 108, and the serial interface 109. Lead PA7 of the enhanced option board interface 57 selects either the clock/calendar/RAM chip, when PA7 is high, or the site serial number circuit when PA7 is low. Leads PCϕ-3 provide additional control lines for the clock/calendar/RAM chip, and leads PBϕ-7 is low. Leads PCϕ-3 provide additional control lines for the clock/calendar/RAM chip, and leads PBϕ-7 provide address and data for the clock/calendar Ram chip, and data from the site serial number circuit.

Gates 114 and 115 inhibit an external interrupt (OBIRQ) to the microcomputer when the batteries are removed, due to VB+ going low disabling AND gate 11. This feature is analogous to the wake-up switch 71 on the main board being disabled when the batteries are removed due to tpower bus VW+ going low. In both cases, the intent is to not allow the microcomputer to wake-up when the batteries are removed, either due to a RESET or IRQ pulse, which would result in capacitor 69 discharging too rapidly.

Site serial number circuit 108 provides an 8-bit hardware-encoded serial number, unique to each installation. The number is encoded by cutting one or more of the site serial number traces 116. The microcomputer matches the 8-bit hardware site serial number with 8 of the 16 bits in the software site serial number on the Startup card, thus preventing a Startup card from one installation being used elsewhere (there is only one chance in 254 it will work—since site serial numbers ϕ and 255 are ignored—and allow an option board with no traces cut to match any Startup card, if desired).

The site serial number is read by applying power VS+ to multiplexer circuit 117, with select lead PA7 low. The data is then read over leads PBϕ-7.

The serial interface 109 provides an interface between the microcomputer 51 and a portable terminal, such as the NEC 82ϕ1A. The portable terminal is used to download Audit Trail information from the clock-/calendar/RAM chip (such as date and time of the last several card attempts ((successful or not)) to access the lock), and to set the clock in the clock/calendar/RAM chip directly, instead of via a programming card cut at the console. Lead CLK1 provides a synchronous clock for the transmit data (over lead TXD1 (and receive data (lead RXD1). Transistors 118 and 119 provide sufficient current to drive the output leads.

Having thus described preferred and alternative embodiments of the present electronic locking system, including the unique separation of security and data message function which is provided thereby, as well as descriptions of the public key cryptography and a flexible protocol which are used in operating the locking system, those of skill in the art will readily derive additional modifications and embodiments which are within the scope of the invention.

We claim:

1. In the process of activating an electronic lock to perform selected functions controlled by the input of a data message from a magnetic card, the steps of encoding and decoding the data comprising:

providing a card having facilities thereon for writing in an encoded message and providing an electronic lock, the lock being a discrete, stand-alone unit without connection or communication to external processor or memory;

determining a pair of prime factors pq such that pq=n;

selecting a data message, m, for causing the lock to perform the selected functions;

providing n to the lock;

determining a value x such that $x^2 \bmod n = m$;

magnetically writing the encoded value x on the card;

reading the value x into the electronic lock;

calculating $x^2 \bmod n$ at the lock to decode the message, m; and based upon the decoded message operating the electronic lock.

2. A method for selectively effecting the operation of a computer-controlled stand-alone electronic lock based upon the validation of an encrypted data message in a portable storage medium presented to the lock, comprising:

(a) providing a card having facilities thereon for writing in an encoded message and providing an electronic lock, the lock being a discrete, stand-alone unit without connection or communication to external processor or memory;

(b) applying a private cryptographic key to encode the data message;

(c) storing the encoded data message in the portable storage medium;

(d) using the lock computer, applying a public cryptographic key to decode the encoded data message and determine the authenticity thereof; and (e) if the message is authentic, operating the lock in accordance with the stored data message wherein: the public key is n and is the product of the private key, two prime integers pg; the data message is m; the encoded message is x, selected such that $x^2 \bmod n = m$; and the step of decoding the data message involves performing the function $x^2 \bmod n$.

3. The method of claim 2, further comprising implementing operation of the lock based upon a sequentially issued medium, independent of the lack of use of any prior issued media within the sequence, including:

providing the lock with a sequence number $S_L$;

providing the medium with a sequence number $S_C$;

comparing $S_L$ to $S_C$; and if $S_C = S_L$, opening the lock.

4. The method of claim 2 further comprising storing a bridge number, b, in the lock and, if during the comparison step, $S_C$ is greater than $S_L$ by a difference not greater than bridge number, b, opening the lock and updating $S_L = S_C$.

5. The method of claim 2, further comprising implementing operation of the lock based upon a sequentially issued medium, independently of the lack of use of any prior issued media within the sequence, comprising:

storing a bridge number, b, in the lock;

providing the lock with a sequence number $S_L$;

providing the medium with the sequence number $S_C$;

comparing $S_L$ to $S_C$;

if $o \leqq (S_C - S_L) < b$, opening the lock; and if $o < (S_C - S_L) < b$, updating $S_L$ to $S_C$.

6. The method of claim 2, further including implementing operation of the lock based upon a sequentially issued medium, independent of the lack of use of any prior issued media within the sequence, comprising:

storing a negative bridge number, $b_n$, in the lock;

providing the lock with a sequence number $S_L$;

providing the medium with the sequence number $S_C$;

comparing $S_L$ to $S_C$; and if $S_C$ is less than $S_L$ by a difference not greater than $b_n$, opening the lock.

7. The method of claim 6 further comprising, if $S_C$ is greater than $S_L$, updating $S_L$ to $S_C$.

8. The method of claim 2, wherein the data message comprises submessages including operands and operation codes specifying the type and length of the submessage and wherein step (e), operating the lock, comprises skipping submessages unfamiliar to the lock and proceeding to the next known submessage.

9. The method of claim 2, wherein the data message includes submessages designated for individual areas comprising collections of one or more related lock actions selected from lock operating functions and lock programming functions.

10. The method of claim 2, wherein the lock contains a sequence number and the data message designates at least one lock action for a single area and contains a sequence number and further comprising the steps of comparing the lock and data message sequence numbers at the lock and, if the numbers are equal or if the data message sequence number is greater but the difference is not greater than the bridge, implementing the action.

* * * * *